(12) United States Patent
Wurft

(10) Patent No.: US 9,586,438 B2
(45) Date of Patent: Mar. 7, 2017

(54) COVER FOR A WHEEL RIM AND WHEEL HAVING SUCH A COVER

(71) Applicant: Joerg Wurft, Schiltach (DE)

(72) Inventor: Joerg Wurft, Schiltach (DE)

(73) Assignee: BBS GMBH, Schiltach (DE)

( * ) Notice: Subject to any disclaimer, the term of this patent is extended or adjusted under 35 U.S.C. 154(b) by 14 days.

(21) Appl. No.: 14/313,531

(22) Filed: Jun. 24, 2014

(65) Prior Publication Data

US 2015/0008724 A1    Jan. 8, 2015

(30) Foreign Application Priority Data

Jul. 8, 2013 (DE) .......................... 10 2013 213 355

(51) Int. Cl.
| | | |
|---|---|---|
| B60B 7/06 | (2006.01) | |
| B60B 7/01 | (2006.01) | |
| B60B 21/02 | (2006.01) | |
| B60B 21/10 | (2006.01) | |
| B60B 7/00 | (2006.01) | |

(52) U.S. Cl.
CPC ............... B60B 7/063 (2013.01); B60B 7/01 (2013.01); B60B 21/02 (2013.01); B60B 21/102 (2013.01); B60B 7/0073 (2013.01); B60B 2310/302 (2013.01); B60B 2310/318 (2013.01); B60B 2360/104 (2013.01); B60B 2360/32 (2013.01); B60B 2900/111 (2013.01); B60B 2900/112 (2013.01); B60B 2900/113 (2013.01); B60B 2900/1216 (2013.01); B60B 2900/133 (2013.01)

(58) Field of Classification Search
CPC .. B60B 7/00; B60B 7/01; B60B 21/02; B60B 7/0073; B60B 21/102

USPC ........ 301/37.24, 37.25, 37.31, 37.35, 37.102
See application file for complete search history.

(56) References Cited

U.S. PATENT DOCUMENTS

| | | |
|---|---|---|
| 2,130,881 A | 9/1938 | Frank |
| 2,970,014 A * | 1/1961 | Lyon ......................... B60B 7/01 |
| | | 301/37.23 |

(Continued)

FOREIGN PATENT DOCUMENTS

| | | | |
|---|---|---|---|
| DE | 29 23 489 | 12/1980 | |
| DE | 0531892 A1 * | 3/1993 | ............... B60B 7/00 |

(Continued)

OTHER PUBLICATIONS

DE 10 2013 213 355.3 Office Action dated Mar. 11, 2014, 6 pages—German; 3 pages—English.

(Continued)

*Primary Examiner* — S. Joseph Morano
*Assistant Examiner* — Jean Charleston
(74) *Attorney, Agent, or Firm* — Andrew F. Young, Esq.; Lackenbach Siegel, LLP

(57) ABSTRACT

The invention relates to a cover for a wheel rim of a wheel, more particularly for a wheel rim of an alloy wheel for motor vehicles, wherein the wheel rim has a rim inner well, which merges into a rim inner flange that is arranged facing a motor vehicle when the wheel is mounted, and as a result, the wheel rim has an uninterrupted contoured section on the axially inner side. The invention, the rim inner flange can be sealed in the axial direction (a) by means of the cover. The invention further relates to a wheel, particularly having such a cover.

4 Claims, 3 Drawing Sheets

(56) References Cited

U.S. PATENT DOCUMENTS

| | | | | |
|---|---|---|---|---|
| 4,826,253 A * | 5/1989 | Shirai | ................ | B60B 7/12 301/37.35 |
| 7,314,255 B2 * | 1/2008 | Wang | ................ | B60B 7/10 301/37.102 |
| 2005/0012383 A1 * | 1/2005 | Hsieh | ................ | B60B 7/14 301/37.102 |
| 2009/0284070 A1 * | 11/2009 | Chen | ................ | B60B 7/10 301/37.31 |
| 2010/0194181 A1 * | 8/2010 | Noriega | ................ | B60B 1/06 301/37.26 |
| 2011/0291463 A1 * | 12/2011 | Milicevic | ................ | B60B 7/01 301/37.24 |

FOREIGN PATENT DOCUMENTS

| | | |
|---|---|---|
| DE | 195 33 612 | 3/1997 |
| DE | 199 57 255 | 6/2001 |
| DE | 697 07 041 | 6/2002 |
| DE | 2 527 160 | 11/2012 |
| GB | 395 150 | 7/1933 |
| WO | WO 93/07012 | 4/1993 |
| WO | WO 2005/123418 | 12/2005 |

OTHER PUBLICATIONS

EP 14174061.3, Search Report issued Nov. 5, 2014, 6 pages—German, 3 pages—English.

\* cited by examiner

COVER FOR A WHEEL RIM AND WHEEL HAVING SUCH A COVER

CROSS REFERENCE TO RELATED APPLICATIONS

This application relates to and claims priority from serial no. DE 10 2013 213 355.3 filed Jul. 8, 2014, the entire contents of which are incorporated herein fully by reference.

FIGURE SELECTED FOR PUBLICATION

FIG. 2

BACKGROUND OF THE INVENTION

Field of the Invention

The invention relates to a cover for a wheel rim of a wheel, more particularly for a wheel rim of an alloy wheel for motor vehicles.

Description of the Related Art

Wheel rims of known wheels, for example from DE 199 57 255 C2, have a rim inner well, which merges into a rim inner flange that is disposed facing a motor vehicle when said wheel is in a mounted state. With the rim inner flange, the wheel rim has an uninterrupted contoured section on the axially inner side.

DE 199 57 255 C2, the entire contents of which are incorporated herein fully by reference, further develops the known subject matter in that profiled segments are attached to the wheel rim in the region of the rim inner well, and together with the wheel rim form a hollow chamber.

According to a method proposed in WO 2005/123418, the entire contents of which are incorporated herein fully by reference, a hollow chamber extending at least partially continuously in the peripheral direction is formed in a region of the inner side of a wheel, and is delimited by a profiled wall in a region of the rim inner well and/or the rim outer well. The profiled wall is designed as integral with the rim, or a separate profiled wall is inserted into a profiled section to create a hollow chamber.

Accordingly, there is a need for a cover for a wheel rim and a wheel having such a cover that overcomes the challenges of the related art.

ASPECTS AND SUMMARY OF THE INVENTION

According to one aspect of the present invention, there is provided a cover for a wheel rim of a wheel, more particularly for a wheel rim of an alloy wheel for motor vehicles, wherein the wheel rim has a rim inner well, which merges into a rim inner flange that is arranged facing a motor vehicle when the wheel is mounted, and as a result, the wheel rim has an uninterrupted contoured section on the axially inner side. The invention, the rim inner flange can be sealed in the axial direction (a) by means of the cover. The invention further relates to a wheel, particularly having such a cover.

According to another alternative aspect of the present invention, the invention provides an improvement on wheel rims, particularly in terms of their production and/or assembly methods, their statics, and preferably in terms of their weight and in terms of the tire sounds caused by the wheel rim and/or the wheel. More particularly, an alternative aspect of the invention is to enhance developmental improvements that have been made to the axially inner region, i.e., facing the motor vehicle. This involves avoiding air eddies and providing cost-effective and aesthetically pleasing solutions. Another factor that impacts the appeal of a rim is its appearance on the side of the wheel that faces the vehicle.

Another alternative aspect of the present invention is provided wherein, the cover seals the rim inner flange and/or an open hollow chamber formed therein in the axial direction.

Another alternative aspect of the present invention is provided wherein, the structure that results from the design according to the invention can be described as economical since more efficient manufacturing methods and/or materials for the individual components can be used. Different materials for wheel rim and cover can also be selected and combined, including metals and plastics and combinations thereof.

Another alternative aspect of the present invention is provided wherein, the cover consists essentially of a ring. The ring is aligned radially and extends in the radial direction substantially radially inward from the uninterrupted contoured section to an inner wall of the wheel rim.

Another alternative aspect of the present invention is provided wherein, the radially outer part of the cover is designed to nestle into the contoured section with a radially outer curvature. The cover ends with a radially outer end which is aligned facing the vehicle on the axially inner side.

Another alternative aspect of the present invention is provided wherein, the cover has a radially inner end on the radially inner side, which end is aligned facing the vehicle on the axially inner side.

Another alternative aspect of the present invention is provided wherein, the present invention is provided wherein, the cover is made at least partially of aluminum and/or plastic or a combination thereof.

Another alternative aspect of the present invention is provided wherein, the invention has a rim inner flange with an inner radial wall and an outer radial wall. The two walls extend axially inward, at least partially nearly parallel, and end at least nearly in a common radial plane.

Another alternative aspect of the present invention is provided wherein a wheel of this type can be at least partially sealed on the side facing the vehicle, for example, with ring sections that serve as inserted parts for sealing off the niches to form chambers. Embodiments of this type are primarily aesthetically advantageous.

Another alternative aspect of the present invention is provided wherein, for the wheel according to the invention, a cover according to the invention is arranged on the axially inner side, connecting the two walls.

Another alternative aspect of the present invention is provided wherein, radial webs are arranged extending in a radial direction between the inner radial wall and the outer radial wall, particularly evenly spaced around the periphery of the wheel. As a result, niches are formed in the double-walled rim inner flange, which can be sealed off by means of the cover to form chambers.

Another alternative aspect of the present invention is provided wherein, the cover is glued and/or welded into the wheel rim, resting at least partially in the contoured section.

Another alternative aspect of the present invention is provided wherein, a wheel that is closed off by the cover according to the invention is characterized in that the safety thereof is ensured even if the cover should become detached from its connection to the wheel rim.

Another alternative aspect of the present invention is provided wherein wheel rims according to the invention may optional have a cover according to the invention will be specified in greater detail, in reference to the drawings. The same reference signs will be used to identify the same parts. In the interest of clarity, the figures do not each contain all of the reference signs.

Those of skill in the art will recognize that a conventional classic spoke design with spoke webs extending in a Y-shape has been selected to illustrate the invention (the spoke portion). However, according to the invention, any type of wheel spider or equivalent wheel elements may alternatively be used without departing from the scope and spirit of the present invention.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
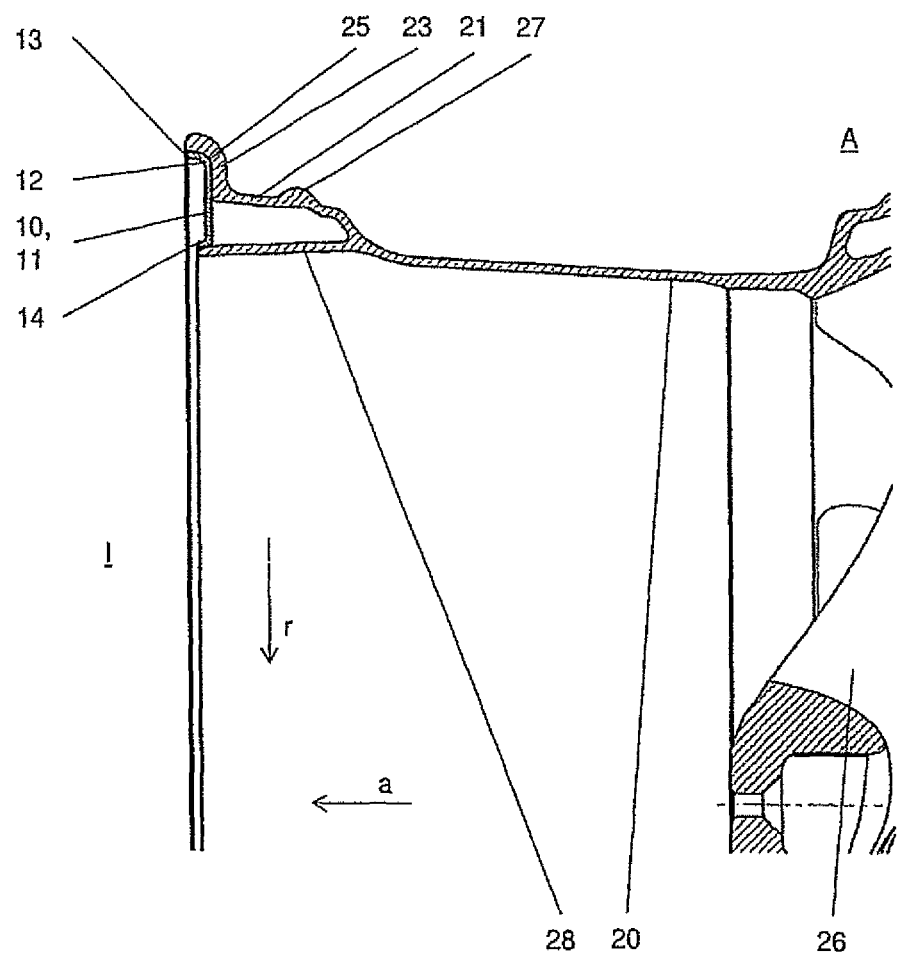
FIG. 1 provides a partial cross-section of a section of a wheel according to the invention, with a cover according to an alternative first embodiment example of the invention, attached to a wheel rim, FIG. 2 provides an exploded partial perspective illustration of an axially inward view of a cross-section of the wheel of FIG. 1 with the cover not yet attached, FIG. 3. Provides a similar exploded partial perspective illustration view according to FIG. 2 of a second alternative embodiment example of a wheel.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

A wheel, including in the case of the two embodiment examples illustrated, consists of a wheel spider 26, which in most cases is arranged on the axially outer side, and a wheel rim 20, 20', which extends from the axially outer side A toward the axially inner side I. The wheel illustrated by way of example is preferably an alloy wheel for motor vehicles. The wheel rim 20, 20' has a rim inner well 21, 21' on the axially inner side I. The rim inner well 21, 21' merges into a rim inner flange 23, 23', which, when said wheel is mounted, is disposed facing a motor vehicle (not shown). Therefore, the wheel rim 20, 20', at least with the rim inner flange 23, 23', has an uninterrupted contoured section 25, 25' on the axially inner side.

It is also known in the prior art to design the rim inner well 21, 21 and/or the rim inner flange 23, 23' as double-walled. Accordingly, the rim inner flange 23, 23' has an inner radial wall 28, 28' and an outer radial wall 27, 27'.

The inner and outer radial walls 28, 28'; 27, 27' of the wheels that are partially illustrated in FIGS. 1 to 4 extend toward the axially inner side I, at least partially parallel, starting from the rim inner well 21, 21' and ending on the axially inner side I in a common radial plane.

Figure 2:
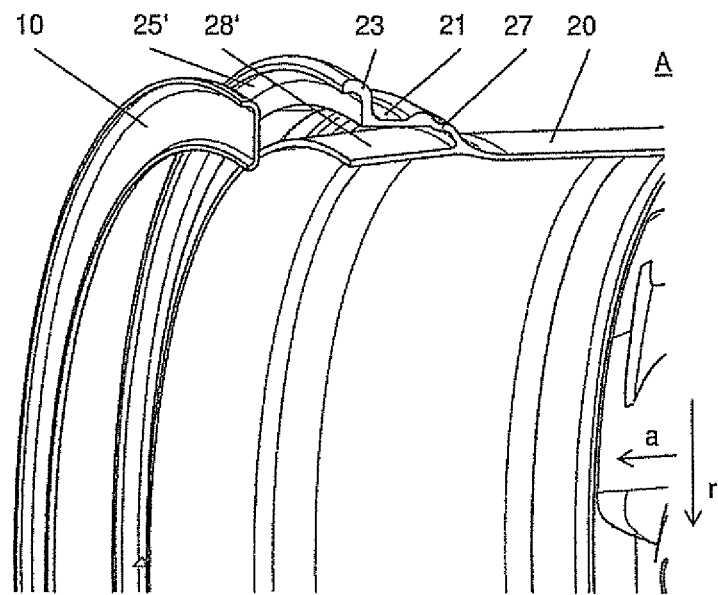
Figure 3:
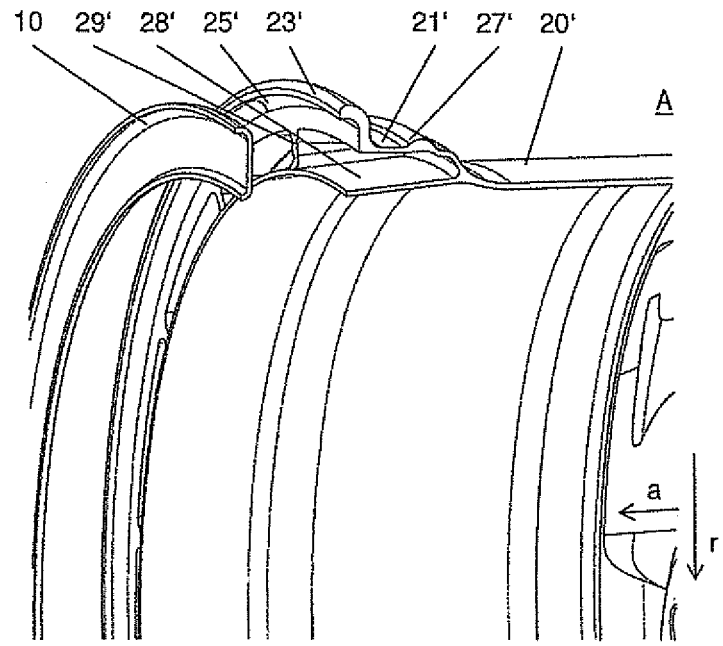

Preferably, as shown in FIGS. 1 to 3, a cover 10 according to the invention is inserted into the contoured section 25, 25' and/or is prepared for this purpose (exploded view in FIGS. 2 and 3). In both embodiment examples, the cover 10 seals the double-walled rim inner flange 23, 23' on the axially inner side I. According to the first embodiment example (FIGS. 1 and 2), a single, uninterrupted and sealed hollow chamber is created. According to the second embodiment example (FIGS. 3 and 4), a plurality of sealed hollow chambers are created, spaced around the periphery of the rim inner flange 23' or the rim inner well 21'.

Figure 4:
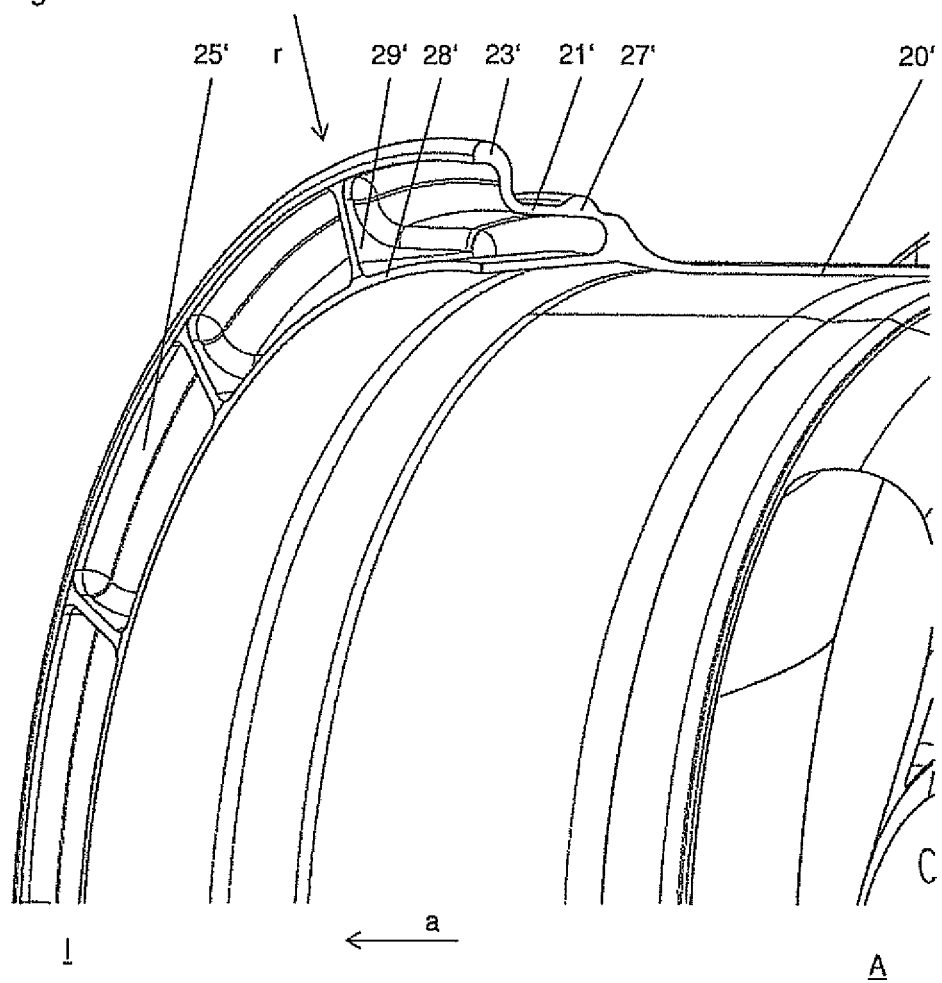
FIG. 4 provides an enlarged partial perspective view of the wheel of FIG. 3, without a cover to denote the interior geometry thereof.

According to the second embodiment example, illustrated in FIGS. 3 and 4, radial webs 29' extending in the radial direction r are arranged between the inner radial wall 28' and the outer radial wall 27', spaced evenly in the peripheral direction. The radial webs 29' fully connect the two walls 27', 28' up to the intersection thereof. As a result, niches are created, which are open only toward the axially inner side I and can be sealed completely by means of the cover 10 to form chambers. The webs can also be designed such that the chambers are interconnected after being sealed by means of the cover, e.g., interior connections therewith for 'interconnecting.'

The cover 10 is preferably glued and/or welded to the axially inner I ends of the walls 27, 27'; 28, 28' and optionally (FIG. 3) to the radial webs 29'.

The cover 10 that is or can be used in the two embodiment examples consists essentially of a radially r aligned ring 11 with rounded ends 13, 14. The radially outer end 13 is adapted with a radially outer curvature 12 to the contoured section 25, 25' of the wheel rim 20, 20'. The radially inner end 14 is likewise oriented toward the axially inner side I. Viewed in cross-section, the cover 10 is preferably designed as symmetrical in relation to a center axis (not shown) that extends in the axial direction of the wheel rim 20, 20'.

The chamber or chambers that is/are sealed by means of the cover 10 can preferably be filled with a fluid medium or with an insulating material or a combination thereof.

The cover 10 is preferably made of plastic. Alternatively, embodiments made of plastic or of combinations of plastic and metal material may be used.

LIST OF REFERENCE SIGNS

10 cover
11 ring
12 radially outer curvature
13 radially outer end
14 radially inner end
20, 20' wheel rim
21, 21' rim inner well
23, 23' rim inner flange 25, 25' uninterrupted contoured section
26 wheel spider
27, 27' outer radial wall
28, 28' inner radial wall
29' radial web
a axial direction
A axially outer side
I axially inner side
r radial direction Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A wheel system, comprising:
a wheel spider and a wheel rim, wherein the wheel rim has a rim inner well which merges into a rim inner flange on an inner side of a wheel, and wherein the wheel rim has a circumferential contoured section on an axially inner side, characterized in that the rim inner flange is formed with an inner radial wall and an outer radial wall, both of which at least extend nearly parallel toward the axially inner side (I) and end at least nearly in a common radial plane, a cover being arranged on the axially inner side, a plurality of radial webs extending in a radial direction (r) and being arranged between the inner radial wall and the outer radial wall and said cover; and said radial webs being spaced evenly around a periphery of the wheel, forming a plurality of respective niches in a double-walled rim inner flange and being fixably sealed by the cover to form separate or interconnected chambers.

2. The wheel system, according to claim 1, wherein:
the cover is fixably sealed to the wheel rim by one of a gluing and a welding; and
said cover is resting at least partially in the contoured section.

3. A wheel system for a motor vehicle, comprising:
a wheel spider;
a wheel rim; and
a cover for the wheel rim and the cover being arranged on an axially inner side (I) of said wheel rim;
the wheel rim comprising:
a rim inner well which merges into a rim inner flange that is disposed facing said motor vehicle when the wheel is mounted, wherein the wheel rim has a circumferential contoured section on said axially inner side (I), wherein the rim inner flange is sealed in an axial direction (a) with the cover and forms a double-walled rim inner flange;
a radially outer part of the cover being shaped to nestle into and resting at least partially in the contoured section with a radially outer curvature so that the radially outer part ends with a radially outer end which is aligned toward the vehicle on the axially inner side (I), a radially inner end on the radially inner side, the end being aligned toward the vehicle on the axially inner side (I), the rim inner flange being formed with an inner radial wall and an outer radial wall, both of which at least partially extend in parallel toward the axially inner side (I) and end in a common radial plane, and wherein the cover is fixably secured to the wheel rim forming a double-walled rim inner flange; and
a plurality of radial webs extending in a radial direction (r) and being arranged between the inner radial wall and the outer radial wall, wherein said radial webs are spaced evenly around a periphery of the wheel, forming respective niches within said double-walled rim inner flange and being sealed by the cover during a use to form a plurality of separate and interconnected chambers.

4. The wheel system of claim 3, wherein: the cover is made at least partially of one of aluminum and plastic.

* * * * *